United States Patent [19] [11] 4,286,555
Williams [45] Sep. 1, 1981

[54] ROTARY INTERNAL COMBUSTION ENGINE

[76] Inventor: Robert H. Williams, Rte. 2, Box 44, Bandera, Tex. 78003

[21] Appl. No.: 30,993

[22] Filed: Apr. 18, 1979

Related U.S. Application Data

[63] Continuation-in-part of Ser. No. 956,206, Oct. 30, 1978, abandoned.

[51] Int. Cl.³ .............................................. F02B 53/00
[52] U.S. Cl. .................................................... 123/228
[58] Field of Search ................ 123/203, 228, 242, 244

[56] References Cited

U.S. PATENT DOCUMENTS

| | | | |
|---|---|---|---|
| 859,474 | 7/1907 | Williams | 123/228 |
| 1,199,489 | 9/1916 | Nield | 123/228 |
| 1,309,096 | 7/1919 | Leibing | 123/228 |
| 2,175,265 | 10/1939 | Johnson | 123/228 |
| 3,220,388 | 11/1965 | Trotter | 123/228 |
| 3,882,827 | 5/1975 | Williams | 123/228 |
| 3,918,413 | 11/1975 | Eiermann et al. | 123/203 |

FOREIGN PATENT DOCUMENTS

1373370  8/1964  France .................................... 123/228

*Primary Examiner*—Michael Koczo, Jr.
*Attorney, Agent, or Firm*—Gunn, Lee & Jackson

[57] ABSTRACT

A rotary internal combustion engine comprising a cylinder in a stator sealed between parallel end plates, a power shaft concentric with the cylinder bore and journaled in bearings in the end walls, an annular eccentric rotor fitted onto the shaft, and an annular piston concentric with and fitted over the rotor making sliding sealing engagement with both end plates. An abutment centered preferably between 10:00 and 10:30 o'clock on the stator seals the space between the cylinder and piston from endplate to endplate and forms the counter-clockwise end of a combustion-expansion chamber. A second abutment, centered preferably between 1:30 and 2:00 o'clock, seals the space between the cylinder and piston from endplate to endplate and forms the clockwise end of the combustion-expansion chamber. The combustion chamber centered at 12:00 o'clock comprises a shallow arcuate cavity adjacent the path of the piston and opening into the cylinder. Fuel injection means for the invention engine maybe mounted on an endplate in advance of the first abutment or positioned on the end wall at approximately 12:00 o'clock to inject forward directly into the combustion chamber. Various means for admitting compressed air into the combustion-expansion chamber and exhausting the spent gases as well as various types of abutments are also disclosed.

3 Claims, 17 Drawing Figures

ROTARY INTERNAL COMBUSTION ENGINE

SUMMARY OF THE INVENTION

This patent application is a continuation-in-part of my application Pat. Application Ser. No. 956,206, filed Oct. 30, 1978, titled ROTARY INTERNAL COMBUSTION ENGINE, which earlier application is now abandoned, the essentials of the earlier application being incorporated herein.

Rotary engines have generally suffered from inadequate sealing, short life seals, high friction by seals in rotor scraping face of cylinder and scraping end walls. Some suffer from a combustion expansion chamber of such design that its cross-sectional area broadens as the power stroke advances, allowing gases to expand radially into space where they accomplish no work. Most rotary engine designs also require pre-compressed fuel, with accompanying losses of energy, expecially through loss of heat. The Wankel and my engines, patented in recent years, have suffered from one or more of these handicaps. My latest patent, U.S. Pat. No. 3,882,827, requires blade seals which must expand outward from their slots in a rotor under heavy combustion pressures against their sides in order to maintain sealing contact with the cylinder. The industry so far has not been able to make this type of seal function satisfactorily. The Wankel rotary, though it compresses its own fuel, suffers from inadequate sealing, short life seals, friction between seals and cylinder and between rotor and end walls, and especially from loss of energy due to radially broadening of lobed expansion chamber. Because of the shape of the Wankel expansion chamber, in relation to its combustion chamber and to the triangular piston, that rotary engine, though a simple engine, cannot make the fullest use of the energy released during combustion.

The invention herewith provides positive sealing and sealing which should prove durable, and which performs with much less friction. It inhales a charge of air and compresses it directly into the combustion chamber. It has additional features which should make it a highly competitive engine: it is a simple engine; it provides a great abundance of air without extra machinery such as a turbocharger; and its expansion chamber is such that it must make efficient use of the combustion gases. The automatic availability of two and a half times as much air as a conventional piston engine of equal displacement can inhale most likely will make this rotary engine adaptable for use as a diesel. The invention engine is well suited to fuel injection with quick acceleration, fuel economy, exceptional power per cubic inch of expansion chamber and a comparatively clean exhaust. It is obviously a high-altitude engine. Manufacturers of internal combustion engines have found that they can boost the power of an internal combustion engine by as much as 40 percent by adding a turbocharger to pump extra air into the cylinders. However, turbochargers are expensive and temperamental and there is a time lag of about three seconds—a very disturbing time lag to an automobile driver in need of a sudden surge of power for passing another vehicle—before said turbocharger provides the power surge. In the rotary design herewith the needed air is inherently and instantly available to the operator by merely depressing the accelerator pedal, and at no extra cost, for machinery. As for the shape of the expansion chamber, its cross sectional area in all models actually contracts to some extent as the power stroke advances, something which I believe to be unique among internal combustion engines. In some models the contraction is considerable. While this feature remains to be tested, it seems obvious that the concentration of the dissipating gases must of necessity concentrate their heat and hold it longer during the power stroke, and therefore sustain torque longer, which means getting more power out of a given fuel charge, burning up more of the hydrocarbons, leaving a cleaner exhaust. This is obviously a high torque engine, with short stroke and an expansion chamber of large cross section. A cylinder nine inches in diameter by three inches "long" (between end walls) with a piston seven inches in diameter, and the combustion-expansion chamber at the end of power stroke providing roughly 28 cubic inches volume, should be considerably more powerful than a 56 cubic inch cylinder in a conventional four-phase cycle piston engine, since this rotary engine produces a power stroke with each revolution and is supercharged with extra air.

Designers of piston engines never are able to find as much room as desirable for intake and exhaust valves; there is always some choking, especially at higher rpm. Both the exhaust port and the port admitting air to the combustion chamber can be proportionately larger in this engine. A great wave of air can be swept in.

Another not unimportant virtue of this engine is that, in a cylinder no larger than seven inches in diameter by two and a half inches between end walls, enough space is available for at least two spark (or glow) plugs in the combustion chamber.

The engine is of such design as to adapt well to modular production. Engine horsepower can thus be increased by merely adding one or more cylinders (with proper timing). The modular construction should make it somewhat easier, too, for the manufacturer to provide for cutting out of one or more cylinders when the engine is cruising under moderate power. Cutting out some cylinders, letting the engine cruise on fewer cylinders, should normally improve fuel economy, especially in this engine, since a cylinder will be more efficient under medium to heavy loads because of the abundance of air available.

Several automatic means of exhausting the spent gases from the expansion chamber can be used, requiring no cams or gears, but all such means other than those claimed herein provide ports too small if they are to be closed again automatically before the compression builds up excessively in compression chamber. One such automatic means, with an exhaust port in at least one end wall, shown and claimed herein, can provide a port large enough to be practical when the piston is comparatively large in diameter in relation to the cylinder so that the lip or flange on the edge of the piston, sealing against the end wall, can prevent pressurized cooling oil in the engine from spilling out through the exhaust port when the eccentric piston is in a certain position, as will be shown. If the piston is small enough in diameter in relation to the cylinder to provide a big expansion chamber, the flange on the edge of the piston will strike the engine shaft—thus limiting the size of the engine when this type of porting is used.

DETAILED DESCRIPTION OF PREFERRED EMBODIMENTS

An engine shaft 10 in bearings 11 is journaled in parallel end walls 12 and 12a, the end walls sealing between them a cylinder bore 13, in a stator 14, the bore concentric with engine shaft 10. An eccentric annular rotor 15 is keyed to shaft 10 and positioned midway between the end walls inside the engine. Annular piston 18 is fitted on eccentric rotor 15, concentrically with it, preferably with bearing 16 between rotor 15 and piston 18. At least one end seal 19 is provided on each end of piston 18 to maintain yieldable sliding engagement against end walls 12 and 12a. Rotor and piston 18 have a common head 17 at the point of their longest radius and the piston head makes tangential sealing engagement with cylinder 13 throughout a cycle, which is one revolution of the engine shaft. A first abutment 22 positioned preferably near 10:00 o'clock, forms a sealing bridge between cylinder 13 and piston 18, from end plate to end plate, and comprises the counter-clockwise end of a combustion-expansion chamber 21. A combustion subchamber 21a comprises a shallow arcuate cavity in stator 14 centered about 12:00 o'clock, the cavity being adjacent to but out of the path of piston 18, and communicating with cylinder bore 13. At least one spark plug (or glow plug) 31 is mounted in combustion chamber 21. A second abutment 23 positioned preferably near 2:00 o'clock, seals the space between cylinder 13 and piston 18, from end wall to end wall, and forms the clockwise end of combustion-expansion chamber 21. A port 35 in stator 14 at about 3:00 o'clock, is fitted with a one-way inlet valve 36 to admit air to engine. Piston head 17 together with second abutment 23 forms an air suction chamber to clockwise of second abutment, and an air compression chamber to clockwise of said piston head. Various means are available for porting combustion-expansion chamber 21, as various types and combinations of first and second abutments may be used, and some of the means of porting for air intake and for exhausting the spent gases are adaptable only with certain types of abutments.

A preferred type of first abutment 22 (FIGS. 1 and 2) comprises a rectangular plate of rigid material such as aluminum, one end of it with rounded head which head is journaled in a bore in the stator preferably near 10:00 o'clock, the bore parallel to engine shaft 10; the other end of the abutment projecting clockwise and free to swing vertically in chamber 21 between piston 18 and cylinder 13. The cylinder is machined away along the edges of bore 13 to make room for abutment 22 to pivot. Stator 14 is recessed just above abutment 22 to make room for abutment 22 while piston head 17 passes. The lower face of abutment 22 is arcuate on a radius equal to the radius of cylinder 13, to allow abutment 22 to become an extension of the compression chamber as the compression stroke ends. Abutment 22 can be opened automatically by air pressure or it can be lifted by cam 53a keyed to shaft 10 outside the engine, the lifting function performed via cam-following lever 58a which is keyed to a hub 24 on the end of the abutment pivot head, which hub is journaled in the end plate and extends outside to receive lever 58. Pivoting abutment 22 is biased downward toward the piston by spring 27 mounted on post 28 on the outside of the end plate, the spring impinging on knob 26 on the free end of arm 25 which arm is keyed to hub 24. Spring tension can also be applied from the side of cylinder bore 13 against stud 22m screwed into pivot head 22b through an opening 22h in housing 14.

Figure 15:
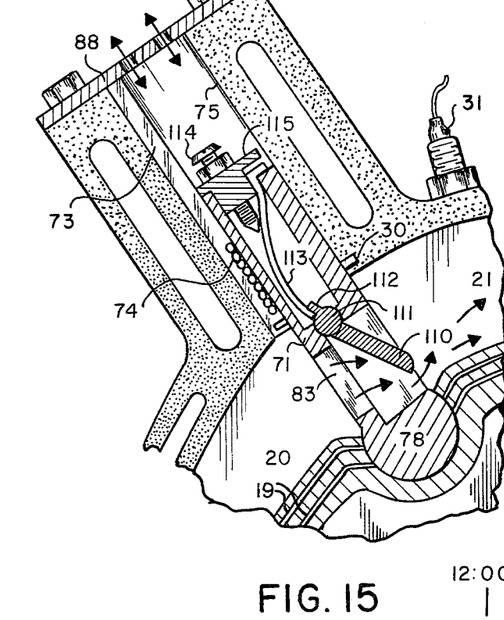
FIG. 15 is a fragmented end view showing an alternate first abutment with an inlet port through it and an hinged cover over port.

A second optional type of first abutment comprises a rectangular hollow abutment 71 (FIG. 15), with rounded head 78 on one end journaled in piston 18 in a bore parallel to engine shaft 10, the piston being recessed on each side of the abutment along the edges of the bore to allow the piston to planetate. The abutment is mounted to reciprocate slidably inside a slot 75 in stator 14, pointing radially outward from the center of cylinder 13, abutment 71 provided with a window 83 through which air can be compressed from compression chamber 20 directly into combustion-expansion chamber 21. Plate 110 on hinge 111 is forced open by compressed air in chamber 20 against adjustable tension of spring 113 and is closed again across window 83 by combustion pressures in chamber 21. A friction plate 73 on the side of the abutment where wear is heaviest is readily removable for replacement by removing cover plate 88. A fret-like yieldable seal 30 is mounted in a slot in the housing to sweep the face of the reciprocating abutment on its high-pressure side.

Figure 16:
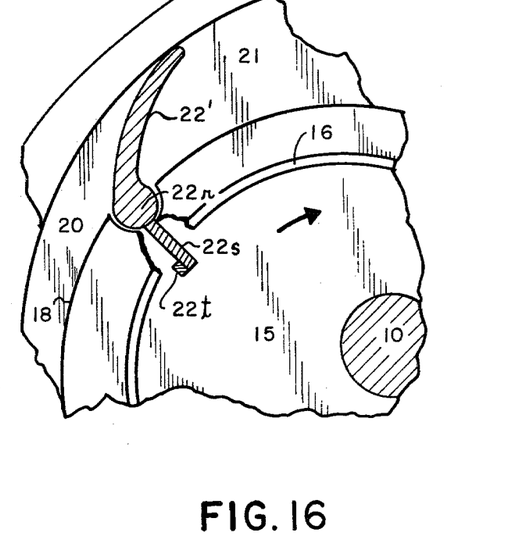
FIG. 16 is a fragmented end view showing an optional type of first abutment, comprising a metal plate, slightly arcuate, hinged in the face of the piston and spring biased against the face of the cylinder, to close the counter-clockwise end of the combustion chamber, said spring biasing adjusted to allow said plate to spring open when pressure of air building up in the compression chamber reaches a pre-determined psi.

A third type of optional first abutment, closing the counter-clockwise end of combustion-expansion chamber 21, (FIG. 16) comprises a rectangular plate of metal 22, preferably light weight, with rounded head 22r on its inner end, head 22r forming a pivot and journaled in a bore in the face of piston 18, preferably near 10:00 o'clock. Spring bias is applied to a narrow projection 22s on the inside of pivot head 22r, on at least one side between rotor 15 and the end wall, through a narrow slot in piston 18. Spring 22t is anchored on the under side of piston 18, between rotor 15 and the end wall. Plate 22' is somewhat arcuate and flexibly slides against cylinder bore 13 to close counter-clockwise end of combustion-expansion chamber 21, yet is yieldable to air pressure in compression chamber 20.

A preferred type of second abutment closing the clockwise end of combustion-expansion chamber 21 comprises a rectangular metal plate 23 (FIGS. 1, 2, etc.), with rounded pivot head 24 journaled in the face of cylinder 18 at about 2:00 o'clock, the other end of plate 23 is free to swing in an area inside the space between piston 18 and combustion chamber 21a. Plate 23 is slightly arcuate to conform roughly with cylinder bore 13, its free swinging end held tangentially against the face of piston 18 by spring 27 mounted on post 28 outside end wall 12. Spring 27 bears against knob 26a (FIG. 5), on lever 58 which is keyed to hub 24 on the end of the pivot head. A cam 53 on engine shaft 10 outside end wall 12 is designed to lift abutment 23 off the face of piston 18 at the end of the expansion stroke, to let spent gases spill out between abutment 23 and the face of piston 18 into exhaust port 32, cam 53 allowing abutment 23 to close again in time for combustion chamber 21 to receive next charge of compressed air.

An optional type of second abutment (FIGS. 8 and 10), comprises a metal plate 67 rigidly fixed to piston 18 and projecting radially outward from the center of the piston, said piston 67 being coextensive with end walls 12 and 12a and preferably fitted with a yieldable rib seal 66 along each edge contacting the end walls, the rib seals being connected across the face of the abutment by rib seal 66a; said abutment being mounted slidably through a slotted pivoting bearing 64 in the stator, optionally with needle bearings 74 along the high-friction side of the sliding abutment. Another optional type of second abutment, closing the counter-clockwise end of chamber 21, comprises a hollow abutment 67a (67b) (FIG. 9) rigidly fixed to piston 18 and slidably reciprocating through pivoting bearing 64b in stator 14 centered preferably near 2:00 o'clock. Metal plate 77c slidably mounts in hollow of abutment 67a and 67b while an arm of plate 77c projects through a narrow slot in the face of piston 18 on each side of rotor 15, and bears against a cam 15a bolted to rotor 15 near its perimeter, the plate being spring-biased inward, and the cam being designed and positioned to permit the plate to slide inward at the end of the expansion stroke to bring a window 83b through plate 77c into mating position with window 83a through the abutment, letting spent gases spill out of expansion chamber 21 into exhaust port 32. Cam 15a is designed to return plate 77c to its original position, closing exhaust port 32, in time for combustion-expansion chamber 21 to receive the next charge of compressed air. Deflector 33 is spring biased against the face of piston 18 to deflect spent gases out via port 32.

Figure 13:
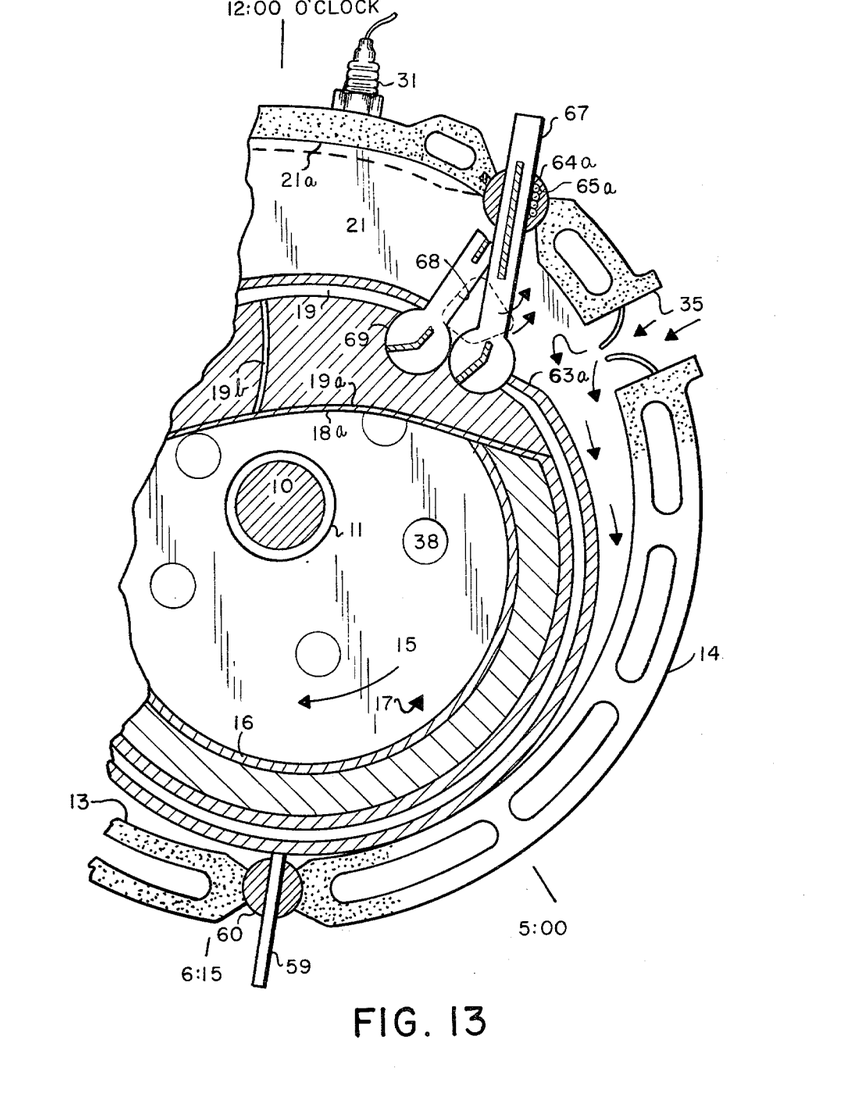
FIG. 13 is a fragmented end view showing an alternate means of exhausting spent gases from the engine, in which design the second abutment comprises a plate-plunger pivoted in the face of the cylinder and slidably reciprocating through a pivoting bearing in the housing; the piston tethered to the housing, preferably by a rod of small diameter at 6:00 o'clock; an exhaust port comprising a hole in at least one end wall so positioned that the oscillating second abutment uncovers said hole at the end of the expansion stroke, covering it again in time for the combustion chamber to receive the compression charge, and a flange on the edge of the piston to keep pressurized cooling oil from spilling out through said port in the end wall.
Figure 14:
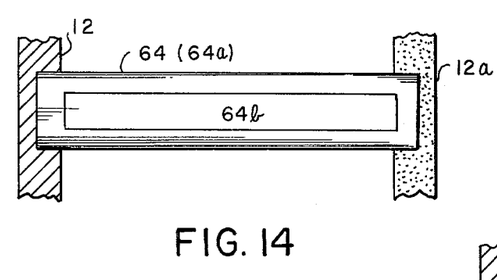
FIG. 14 is a fragment showing the pivoting bearing mounted in the housing, with a slot through which the second abutment shown in FIG. 13 reciprocates.

Still another optional type of second abutment, which can be used in an engine wherein the piston is as large as about 21/24 the diameter of the cylinder, and the combustion-expansion chamber therefore, comparatively small, comprises a rectangular plate 67 (FIG. 13) with a rounded head 69 on its inner end, the head being pivotally journaled in a bearing in the face of piston 18, and piston 18 being machined away along the edges of the bore to allow the abutment to flex clockwise and counter-clockwise as piston 18 planetates. The abutment is mounted slidably through a slot in pivoting bearing 64a in stator 14. Piston 18 is tethered to cylinder 13 preferably by a rod 59 of small diameter in a pivoting bearing 60 in stator 14 at about 6:00 o'clock. Port 68 in at least one end wall is so positioned that the abutment must pass over it and uncover it at the end of the expansion stroke to let spent gases spill out via exhaust port. A flange 18a along the edge of piston 18 and just clearing engine shaft 10 in all positions of the piston, fitted with a yieldable seal 19a along its inner edge, prevents pressurized cooling oil from spilling out of the engine.

An optional means of venting the engine at the end of the expansion stroke, other than the means already described herein, comprises a poppet valve 9 (FIG. 8) with a valve stem 9a through stator 14 in the perimeter the of combustion chamber 21a, with the exhaust port 9b. Poppet valve 9 is operated by a cam mechanism not shown.

Another optional exhaust means, without need of cams or gears, where piston 18 is tethered by a second abutment 67 rigidly fixed to piston 18 (See FIGS. 10, 11 and 12) comprises a sleeve 202 on each side of rotor 15 and attached to the rotor, sleeves 202 being virtually coextensive with the end walls 12 and 12a and rotating closely but not engaging the underside of piston 18, with suitable seals acting yieldably against the underside of piston 18. Box 202a on one side of rotor 15, and open at the top receives spent gases at the end of the power stroke when the box passes under and mates with an opening 70a through rotor 15 adjacent to and connecting with the box and connecting into a second box 201' on the opposite side of rotor 15. Second box 201' is elongated in a clockwise direction to pass under the inner end of abutment 67 and deliver spent gases out via port 207' in the face of that side of piston 18, gases thence passing out of engine via exhaust port 32. Yieldable seals in the periphery of sleeves 202 engaging the underside of the piston keep both openings in piston 18 closed except while the engine is beng scavenged.

Figure 17:
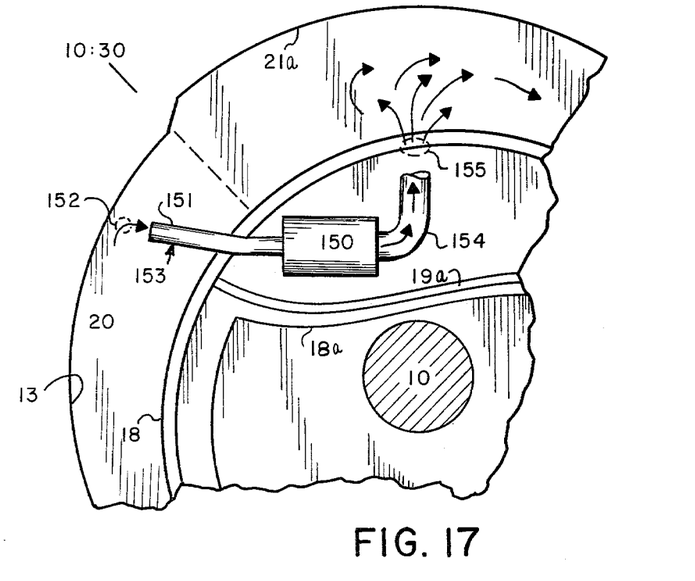
FIG. 17 is a fragmented end view of means for automatically trapping a bit of compressed air from the compression stroke and storing it till the end of the expansion stroke, then releasing it into the combustion-expansion chamber, just as the exhaust port opens, to scavenge the engine.

A means of insuring adequate scavenging of the engine even when a minimum of air is allowed to enter compression chamber 20, comprises a small port 152 (FIG. 17) in an end wall near the perimeter of compression chamber 20, and a few degrees counter-clockwise of the first abutment. A pipe 151 fitted over port 152 and fitted with a check valve, indicated by arrow 153, leads to a small container 150 to store a small amount of compressed air during the compression stroke. A larger pipe 154 leads from storage container 150 to a second port 155 in an end wall. Port 155 is so positioned that it will remain covered by a flange 19a on the edge of piston 18 throughout the expansion stroke but will be uncovered just after the exhaust port opens, allowing the stored compressed air to spill into the expansion chamber to force out spent gases. The means described herein is entirely automatic.

While certain combinations of first and second abutments are shown in the accompanying drawings, certain other combinations can, obviously, be used. For example, a poppet valve for exhausting of spent gases can be used with the two pivoting leaf abutments shown in FIG. 1, in which combination the first leaf abutment can be opened by air pressure when pressure reaches a pre-determined psi, and the second abutment remains at all times in sealing contact with the face of the piston, and cams outside the end walls are eliminated. Also, the type of second abutment 67a (67b) shown in FIG. 9 can be adapted for use as a first abutment by changing the shape and timing of the cam 15a bolted to rotor 15.

OPERATION

Figure 1:
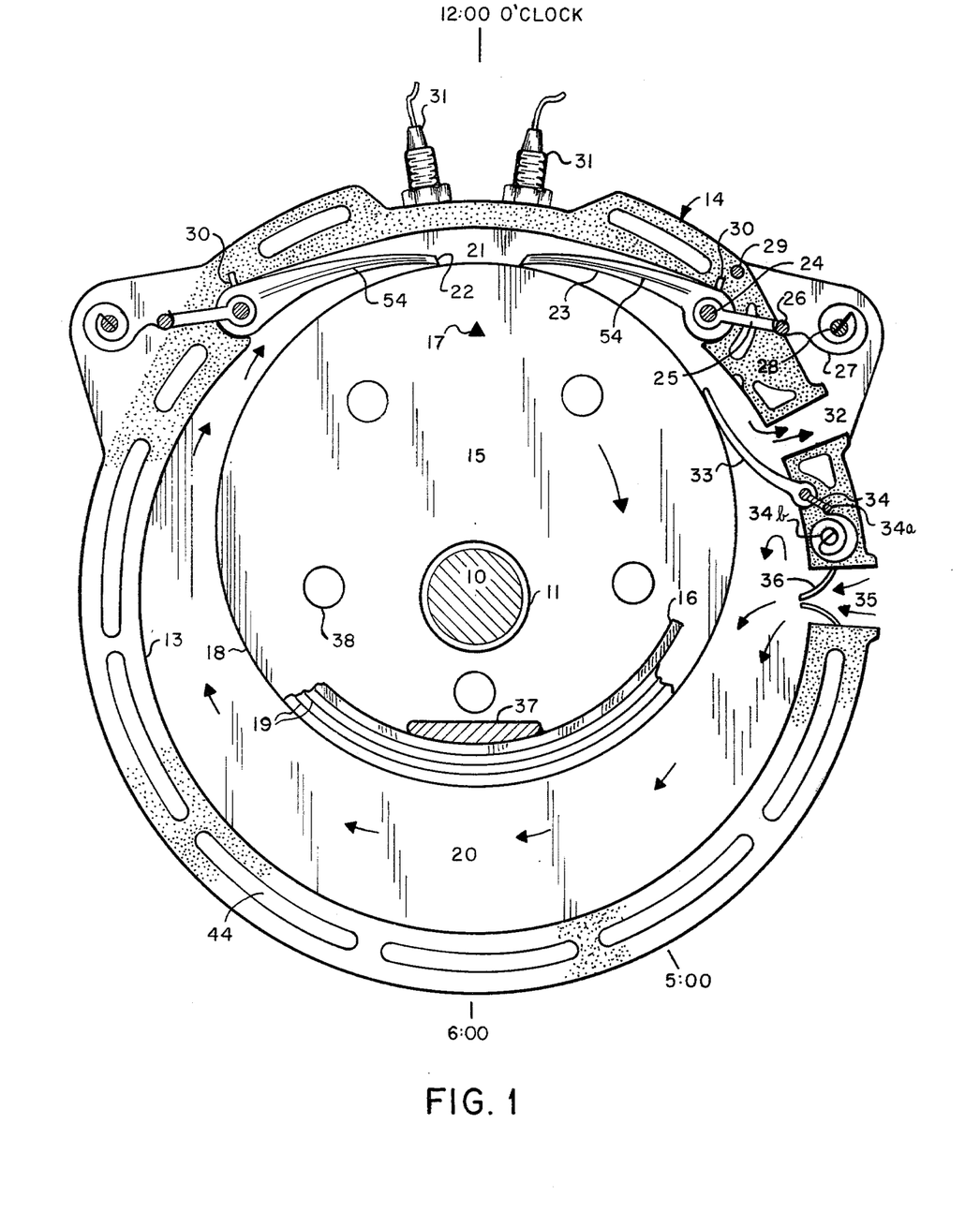
FIG. 1 is an end view (with end plate removed) of one version of the invention engine, with the piston head at 12:00 o'clock, the point of maximum compression.
Figure 2:
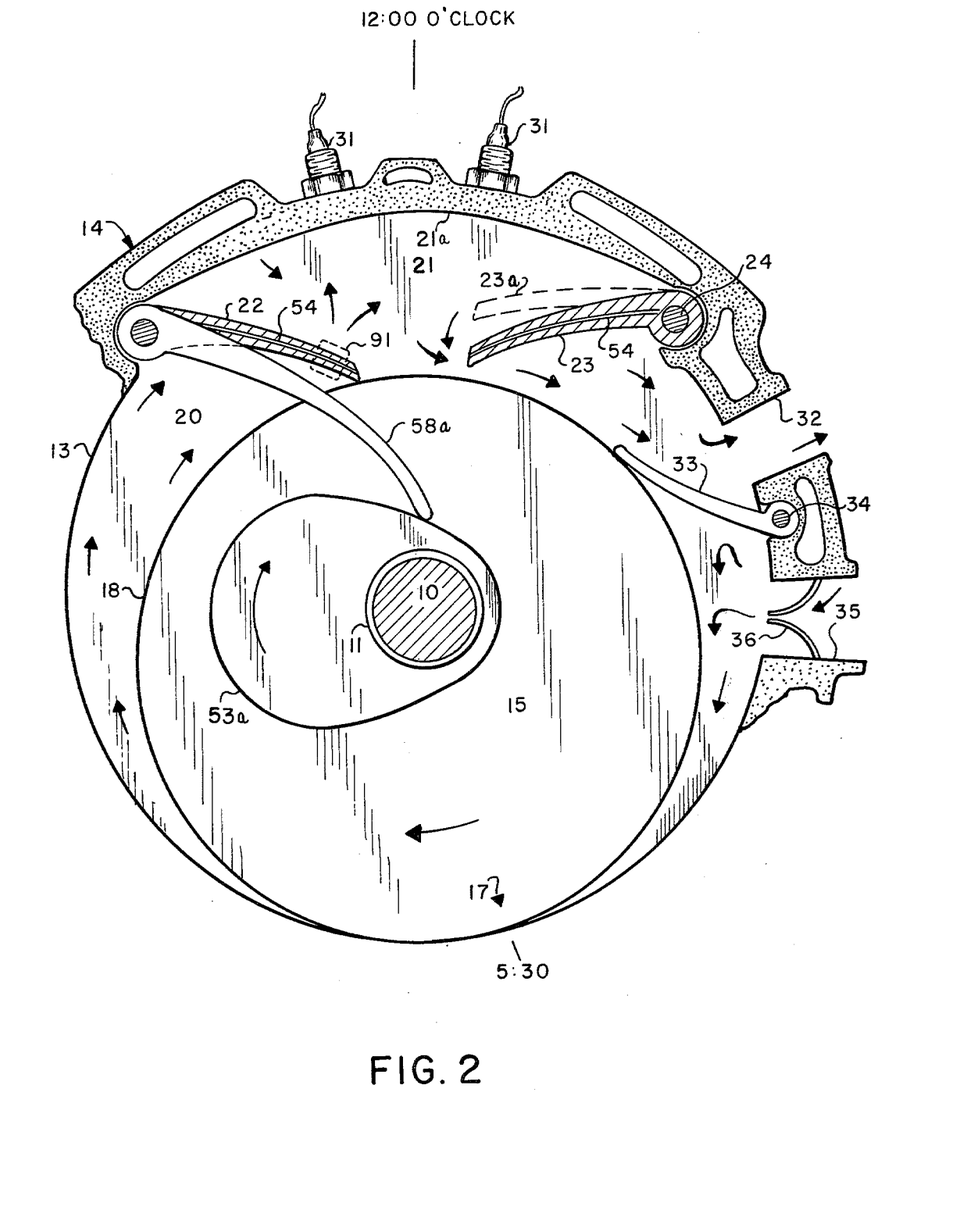
FIG. 2 is a similar end view with the piston head at 5:00 o'clock, at the end of the power stroke, showing a small jet of compressed air allowed into the expansion chamber via a cavity in the end wall, to scavenge the engine immediately after the exhaust port begins to open.
Figure 3:
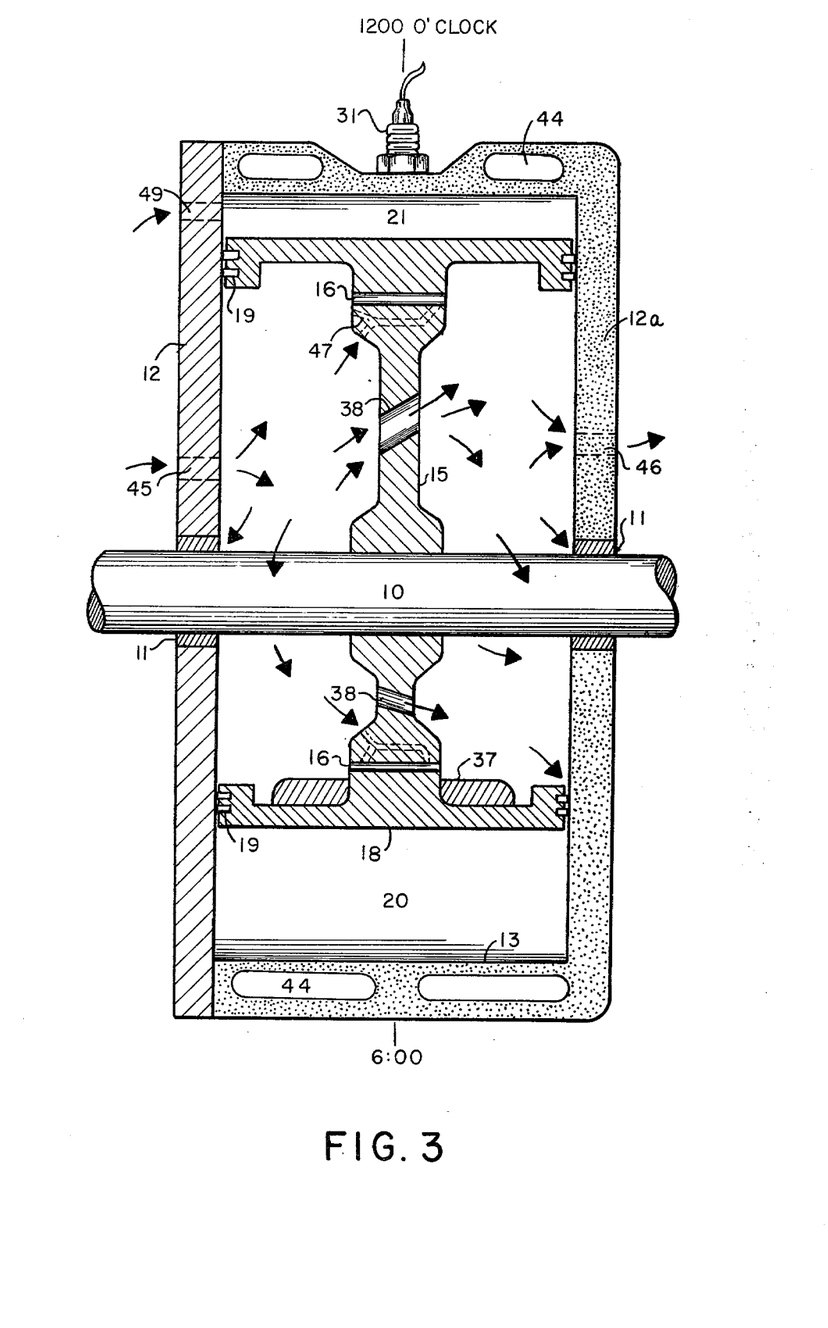
FIG. 3 is a cross sectional side view of the invention engine of FIG. 1, at 12:00 o'clock, showing the skeletalized piston, with yieldable end seals (against end walls) and cooling oil forced through hollows of the piston and through holes in the web of the rotor.
Figure 4:
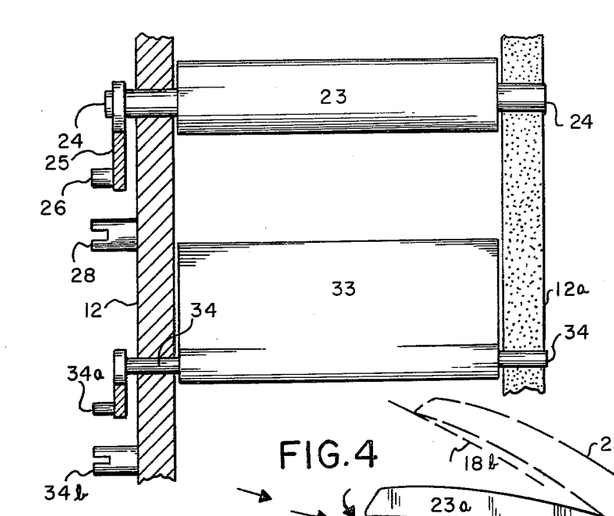
FIG. 4 is a cross sectional side view showing the lever mechanism via which spring tension is applied to the second abutment and to the exhaust deflector.
Figure 5:
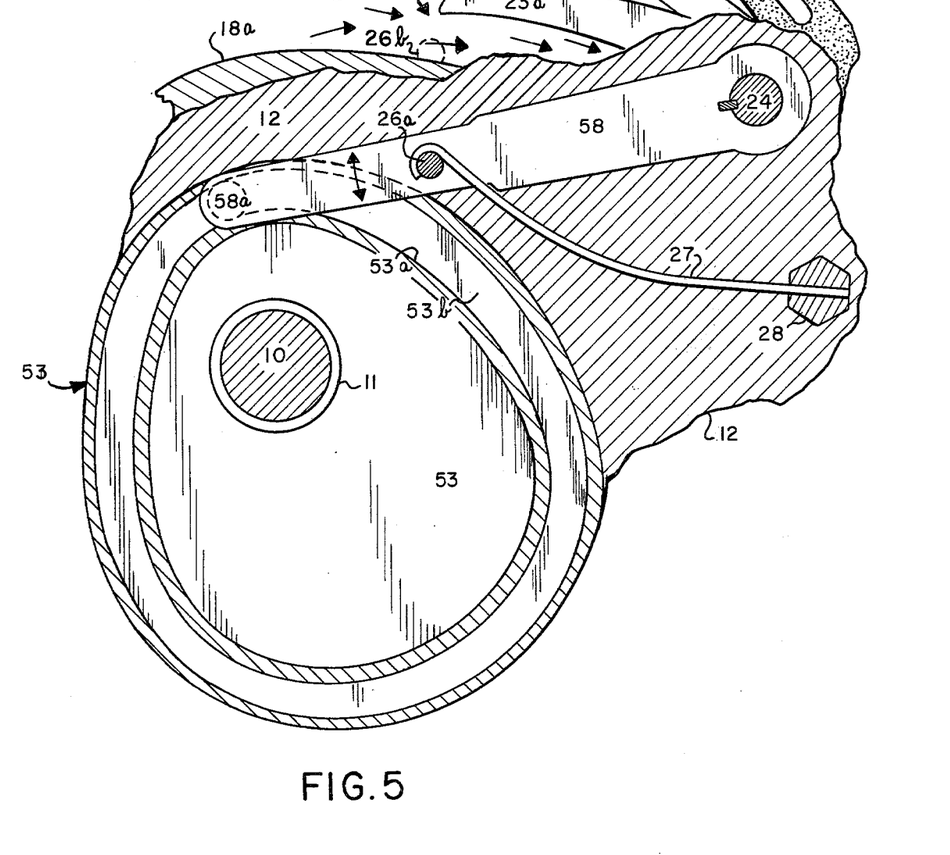
FIG. 5 is a fragmented end view showing the cam and cam lever outside the end wall to lift the second abutment from the face of the piston to vent the engine at end of the expansion stroke.
Figure 6:
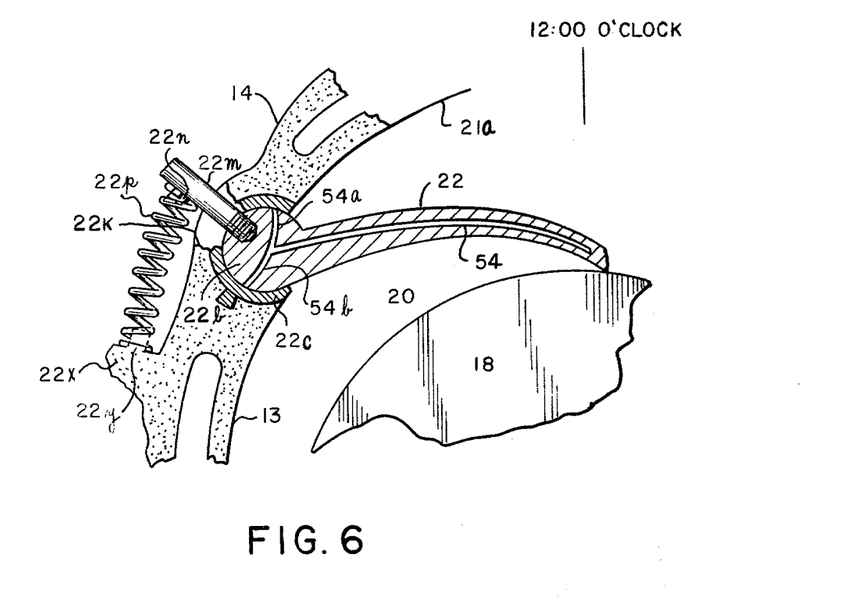
FIG. 6 is a fragmented end view showing an alternate means of applying spring bias to hold the first abutment against the face of piston.
Figure 7:
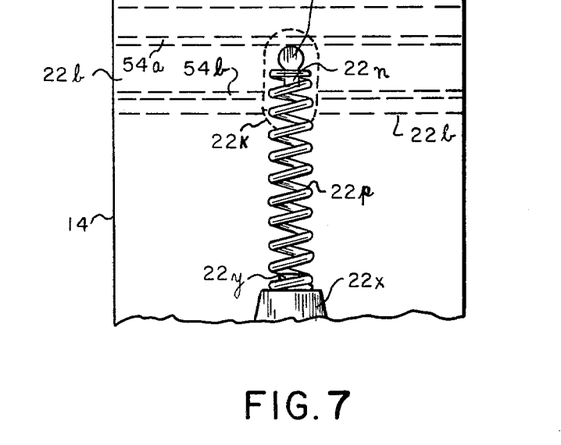
FIG. 7 is a fragmented side view of spring biasing means shown in FIG. 6.

This rotary engine has the four phases of intake, compression, expansion and exhaust with each revolution of the engine shaft. FIG. 1 shows a preferred embodiment, with rotor head 17 at 12:00 o'clock, the point of maximum compression of a charge of air. (Since the piston head is common with the rotor head, it too shall be identified herein by the number 17.) Fuel now may be injected into combustion chamber 21a via port 49 in end plate 12 (FIG. 3) and ignited by one or more spark (or glow) plugs 31 or fuel optionally has already been injected at port 49 in the end plate into inflowing compressed air, to be ignited by one or more spark (or glow) plugs 31. The compression charge is confined between abutments 22 and 23. After ignition, expanding gases bear against piston 18, which exerts downward pressure on rotor head 17, causing rotor 15 to rotate, and being keyed to engine shaft 10, the rotor converts the downward pressure into rotary motion. As rotor 15 advances clockwise, it sucks into the engine, via intake port 35 and one-way inlet valve 36, air from the outside and at the same time compresses the air drawn in during the preceding revolution, against abutment 22, which is held against piston 18 by preset spring tension and, throughout the power stroke, also by the pressure of expanding gases inside the combustion chamber. First abutment 22 is opened by cam 53a outside the end wall 12 or, optionally, by compressed air when it reaches a pre-determined psi. When the piston head reaches the end of the power stroke at a point preferably near 5:00 o'clock, cam 53 outside end plate 12 lifts swinging abutment 23 off piston 18 via lever 58 keyed to pivot hub 24, allowing spent gases to flow out of the combustion chamber into the space between the piston and the cylinder. These spent gases are deflected outside the engine through port 32 by a thin rectangular strip of metal 33 which seals between the end walls, and is anchored by a pivot to stator 14 and is spring biased against piston 18 by a spring outside the end wall via a lever keyed to hub 34 on an end of the pivot, which hub is journaled in the end wall. A jet of compressed air is admitted into the combustion chamber via a narrow cavity 91 hollowed out on the inner face of at least one end plate and so positioned that the free end of swinging abutment 22 lies across the cavity at the end of the power stroke, immediately after exhaust port 32 opens, the jet of air being an aid to scavenging engine. Exhaust port 32 is closed by spring tension or optionally by cam action (FIG. 5). Cam 53 is so shaped as to quickly return abutment 23 to sealing position against piston 18.

Figure 8:
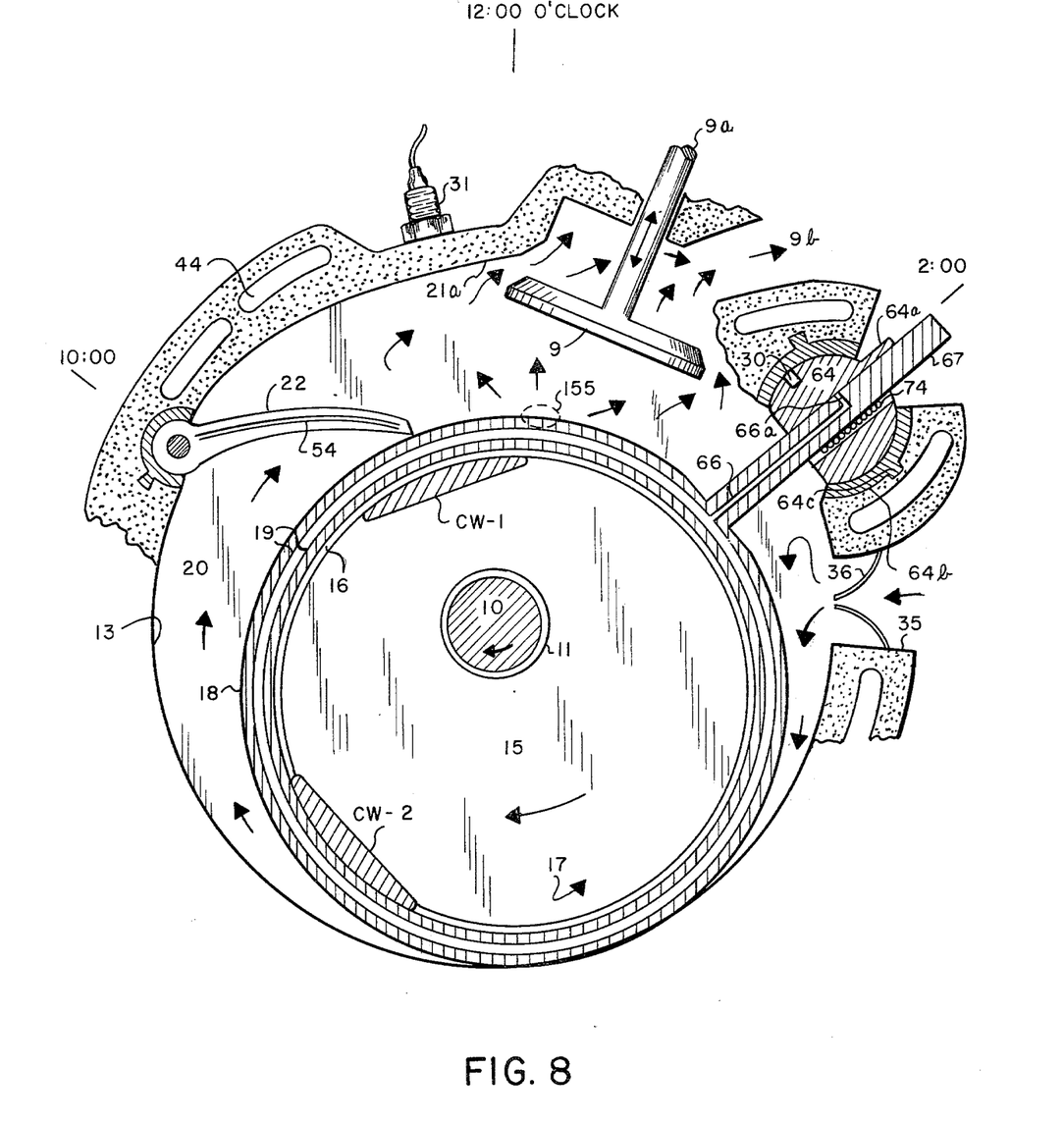
FIG. 8 is an end view of the invention engine with the second abutment flexibly tethering the piston to the cylinder, with pivoting leaf abutment at counter-clockwise end of the combustion chamber and with a poppet exhaust valve.
Figure 9:
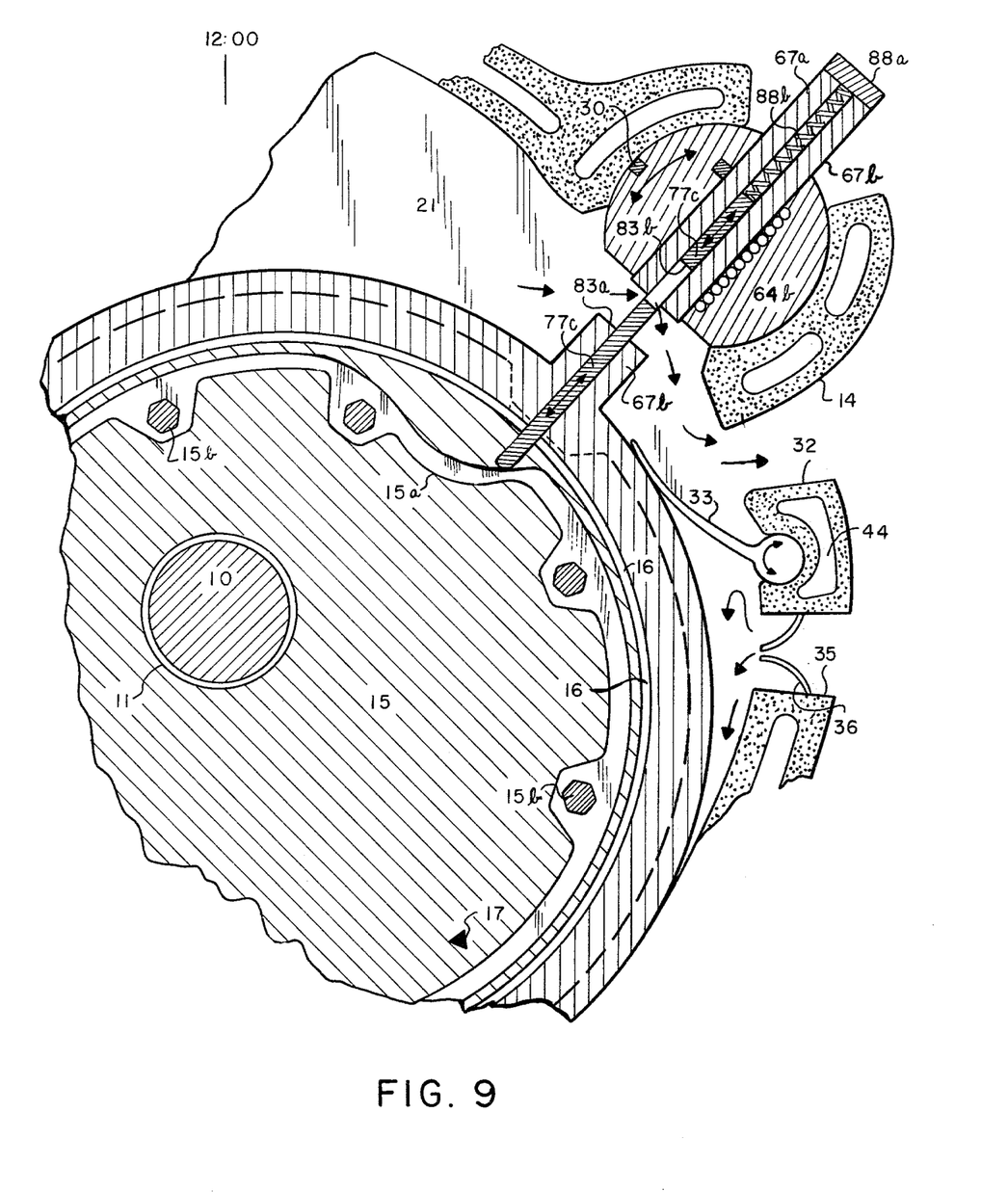
FIG. 9 is a fragmented end view with a cam bolted to the rotor inside the engine, operating a reciprocating sliding plate valve inside a hollow abutment, to vent the engine at end of the power stroke.

While the chief functions of this engine are the same in all combinations of first and second abutments and various exhaust means, the mechanical differences shown in FIG. 8 are considerable. The intake and compression action is the same as previously recited, but the second abutment comprises a metal plate 67 coextensive with the end walls, rigidly tethered to piston 18, and slidably reciprocating through a pivoting bearing 64 in stator 14, the mechanism allowing piston 18 to planetate as off-center rotor 15 rotates. Poppet valve 9 functions as an exhaust port.

Figure 10:
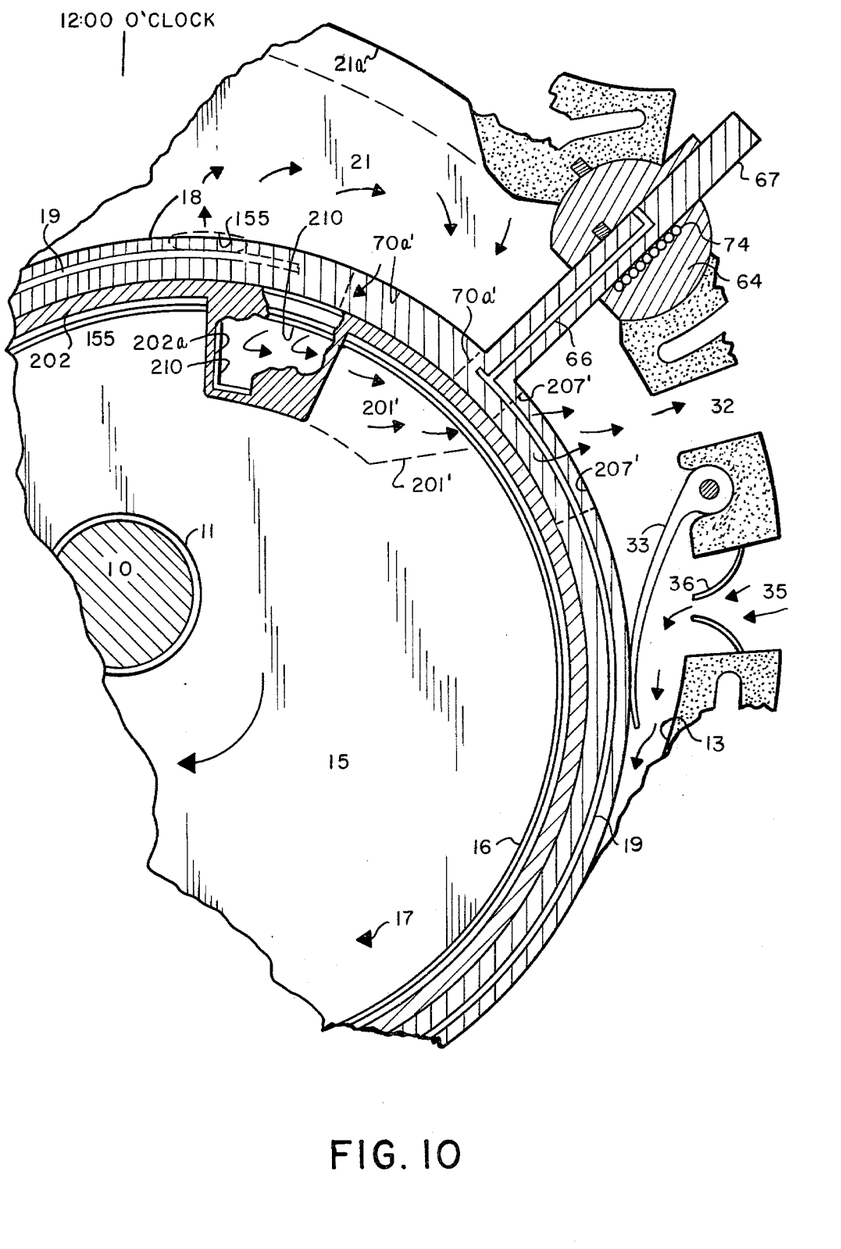
FIG. 10 is a fragmented end view with the piston tethered as in FIG. 9 but an alternate means of venting the engine in which an annular sleeve is bolted to each side of the rotor to rotate closely inside the piston but clearing the piston, their edges clearing the end walls, and an opening in the face of the piston immediately counter-clockwise of the second abutment, via which opening spent gases exhaust through a box carried by a sleeve, which, with proper timing, passes under said opening; thence out by a hole through the rotor into a second box and forward on an opposite side of the rotor to a second opening, clockwise of the abutment, in a face of the piston, said second opening being adjacent to the exhaust port in the engine housing.
Figure 11:
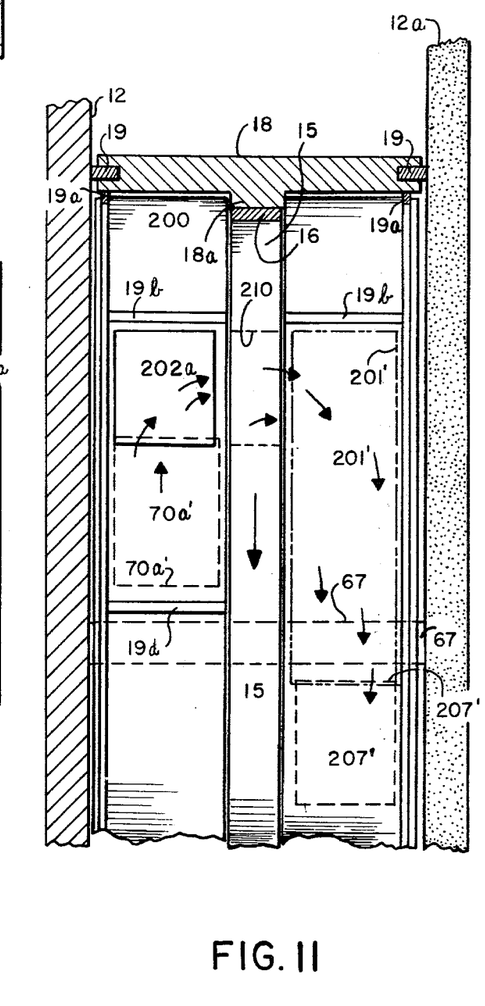
FIG. 11 is a side view of the engine showing the venting system shown in FIG. 10.
Figure 12:
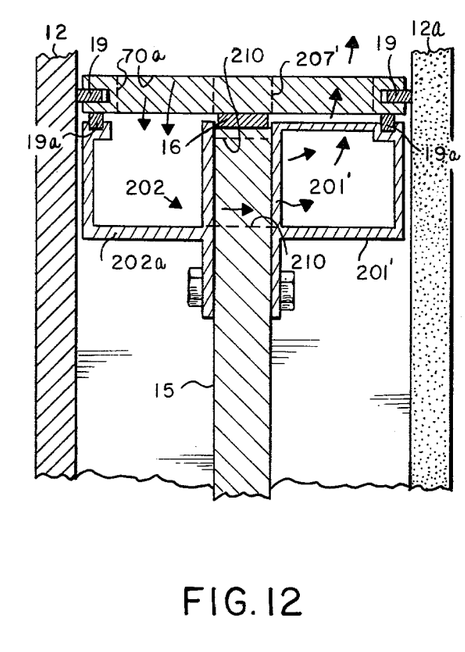
FIG. 12 is a fragmented side view showing said first box with spent gases flowing into it via an opening in the face of the cylinder, and out via a hole in the rotor, as recited above.

In the combination shown in FIGS. 10, 11 and 12, the intake and compression action is the same as recited above, but any of the first abutments can be used. The second abutment is rigidly fixed to the piston and reciprocates in a pivoting bearing 64 in stator 14 and the exhaust is by means fully automatic. The sleeve 202 is bolted to each side of rotor 15 and rotating close to the underside of the planetating piston 18 allows the spent gases to spill out of expansion chamber 21 via a port 70a' in the face of piston 18, into a box 202a and through a hole 210 in rotor 15 adjacent to and connecting with box 202a, and thence into a second box 201' on an opposite side of rotor 15, the second box being elongated to extend forward and allow the spent gases to spill out to clockwise of second abutment 67, via port 207' in the face of piston 18, and out of the engine via exhaust port 32. Perimeter seals 19a and cross seals 19b make yieldable sealing contact with underside of piston 18. Additional cross seals may of course be provided as needed.

Since this engine fires every revolution, it is necessary to close the exhaust port quickly after the end of the expansion stroke, before the air compression reaches more than a few psi in compression chamber. It may be noted that all exhaust means shown herein are designed to provide the required prompt closing, so that a minimum of air will be forced through the expansion chamber, even when under maximum air charge.

It may be noted that when the engine is under very light load, with a minimum of air admitted to compression chamber 20, only a very small amount of air will be available to scavenge the engine. Not much air will be required, of course, when the combustion charge is very small. But auxiliary scavenging air can be provided by means entirely automatic by the device shown in FIG. 17. A small charge of compressed air is forced into storage tank 150 via the small pipe or tube 151 (which is fitted with a one-way valve at 153), through port 152 located near the clockwise end of compression chamber 20. The stored air is held in storage tank 150 by flange 19a on the edge of piston 18, which flange covers the discharge port 155 throughout combustion and till the end of the power stroke. Just after the exhaust port (not shown) in FIG. 17) opens, the rim of piston 18 passes downward uncovering port 155 and letting the compressed air spill into the expansion chamber.

In a variation of this means of cleansing the engine at the end of the power stroke, there are an adjacent pair of windows like 70a' (FIGS. 10, 11 and 12) in the face of piston 18 counter-clockwise of abutment 67 and on opposite sides of rotor 15. An adjacent pair of similar windows in piston 18 like 207' on the clockwise side of abutment 67 and on opposite sides of rotor 15. An adjacent pair of windows in rotating sleeves 202 are on opposite sides of rotor 15, each sleeve window subtending a box the same length and width as the window, its length being such that it exactly spans both piston windows in its path. Thus, when the sleeve windows begin to engage the piston windows on the counter-clockwise side of abutment 67, spent gases in the combustion chamber begin to escape into the boxes and as soon as the boxes begin to engage the second pair of piston windows they form two exhaust channels via which the spent gases pour out of the expansion chamber into the engine space clockwise of the abutment, adjacent to the exhaust port. Yieldable seals are provided between the surfaces of the sleeves and the piston to prevent combustion gases from escaping except at the end of the expansion stroke and to again seal the clockwise end of the combustion-expansion chamber as soon as the sleeve boxes pass the pair of piston windows on the counter-clockwise side of abutment 67.

I claim:

1. A rotary internal combustion engine having a four-phase cycle of intake, compression, expansion, and exhaust in each revolution of the engine shaft, said engine comprising:
   a stator with a cylinder bore enclosed between end walls;
   a power shaft in bearings journaled in said end walls and concentric with said cylinder bore;
   an eccentric annular rotor keyed to said power shaft and positioned approximately midway between said end walls;
   an annular piston coextensive with said end walls fitted on said eccentric rotor and concentric therewith, said piston and said rotor having a common eccentric head with said piston head making tangential sealing engagement with said cylinder substantially throughout said cycle;
   a first abutment having a first end pivotally secured to said stator near 10:00 o'clock and a second end free to project clockwise into said cylinder space far enough to make tangential, sealing engagement with the face of said piston in all positions of said piston;
   a second abutment having a first end pivotally secured to said stator near 2:00 o'clock and a second end free to project counter clockwise into said cylinder space, means for maintaining sealing engagement of said second abutment with the face of said piston and means for removing said sealing engagement when the piston is near the 5:00 o'clock position;
   both first and second abutments making sliding, sealing engagement with both of said end walls and said piston to form a combustion-expansion chamber for confining a fuel charge throughout an expansion stroke and exerting pressure against said piston to cause said eccentric rotor to rotate;
   a combustion chamber comprising a shallow arcuate cavity in said stator centered near 12:00 o'clock and opening into and combining with said expansion chamber;
   a suction chamber and a compression chamber, said suction chamber being the space behind said traveling piston head and said compression chamber being the space forward of said traveling piston head;
   an air inlet port in said stator positioned in the vicinity of 3:00 o'clock, said port fitted with a one-way valve to admit air into said suction chamber as movement of said piston head generates a suction;
   means for injecting a charge of fuel into said combustion chamber and means for firing said fuel charge in timed relation to the position of said piston head;
   exhaust means for expelling spent gases from said combustion-expansion chamber at the end of the power stroke, said exhaust means positioned after 2:00 o'clock and before 3:00 o'clock in said stator.

2. The engine of claim 1 wherein said cylinder is machined away along edges of said bore in said stator to permit said abutments to pivot inside said cylinder space, said abutments spring biased downward toward the face of said piston by a spring mechanism mounted outside said engine and allowing a predetermined pressure in said compression chamber to force said first abutment open and permit a charge of air to be compressed into said combustion chamber and aid in holding said free tip of said abutments in sealing engagement with the face of said piston at the end of said compression stroke.

3. The engine of claim 2 additionally comprising:
   a hub on the pivotal end of said second abutment, said hub projecting through said end wall;
   a cam-follower lever keyed to said hub outside said end wall and having a cam-follower on forward end thereof; and
   a cam on which said cam-follower rides keyed to said engine shaft, said cam profiled to lift said second abutment away from sealing engagement with said piston at the end of the power stroke and subsequently allow spent gases to be removed from said expansion chamber;
   means for conducting said spent gases out of said engine comprising a metal deflector plate one end of which is pivoted in a bore in said stator immediately counter-clockwise of the air intake port in the vicinity of 3:00 o'clock, said plate spring biased at all times against said piston;
   a port in said stator immediately counter-clockwise of said deflector plate through which spent gases are expelled.

* * * * *